Jan. 30, 1968  W. T. JACKSON  3,366,525
METHOD OF MAKING THERMOPLASTIC HONEYCOMB
Filed Feb. 6, 1964  3 Sheets-Sheet 2
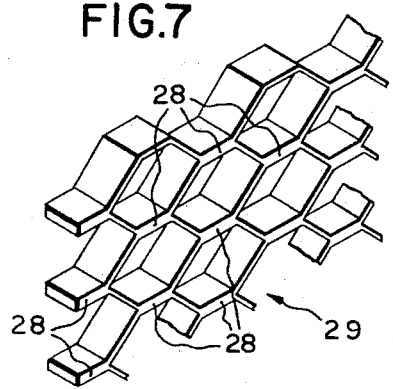
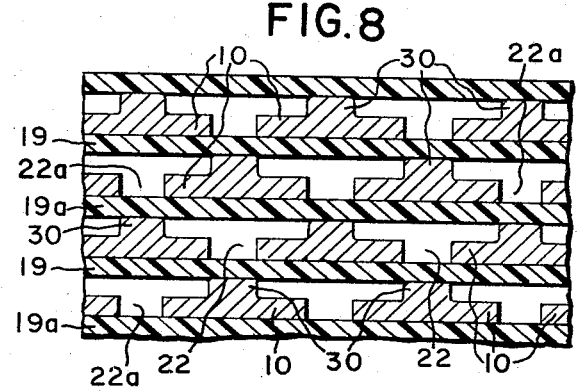
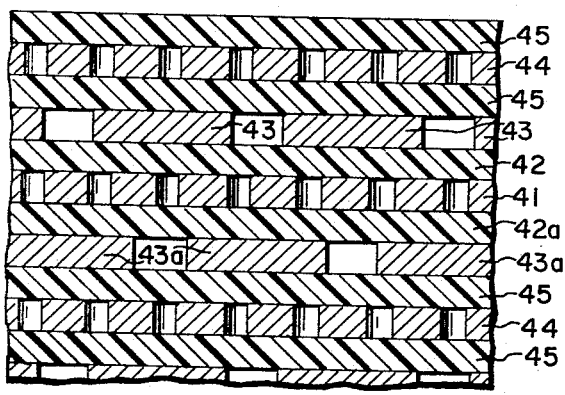
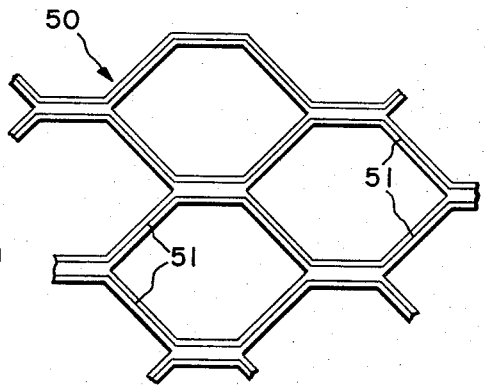
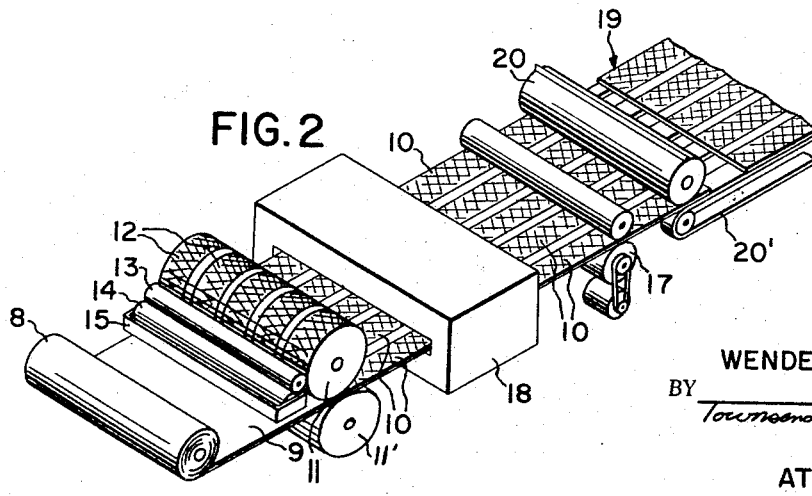
INVENTOR.
WENDELL T. JACKSON
BY Townsend & Townsend
ATTORNEYS Jan. 30, 1968     W. T. JACKSON     3,366,525

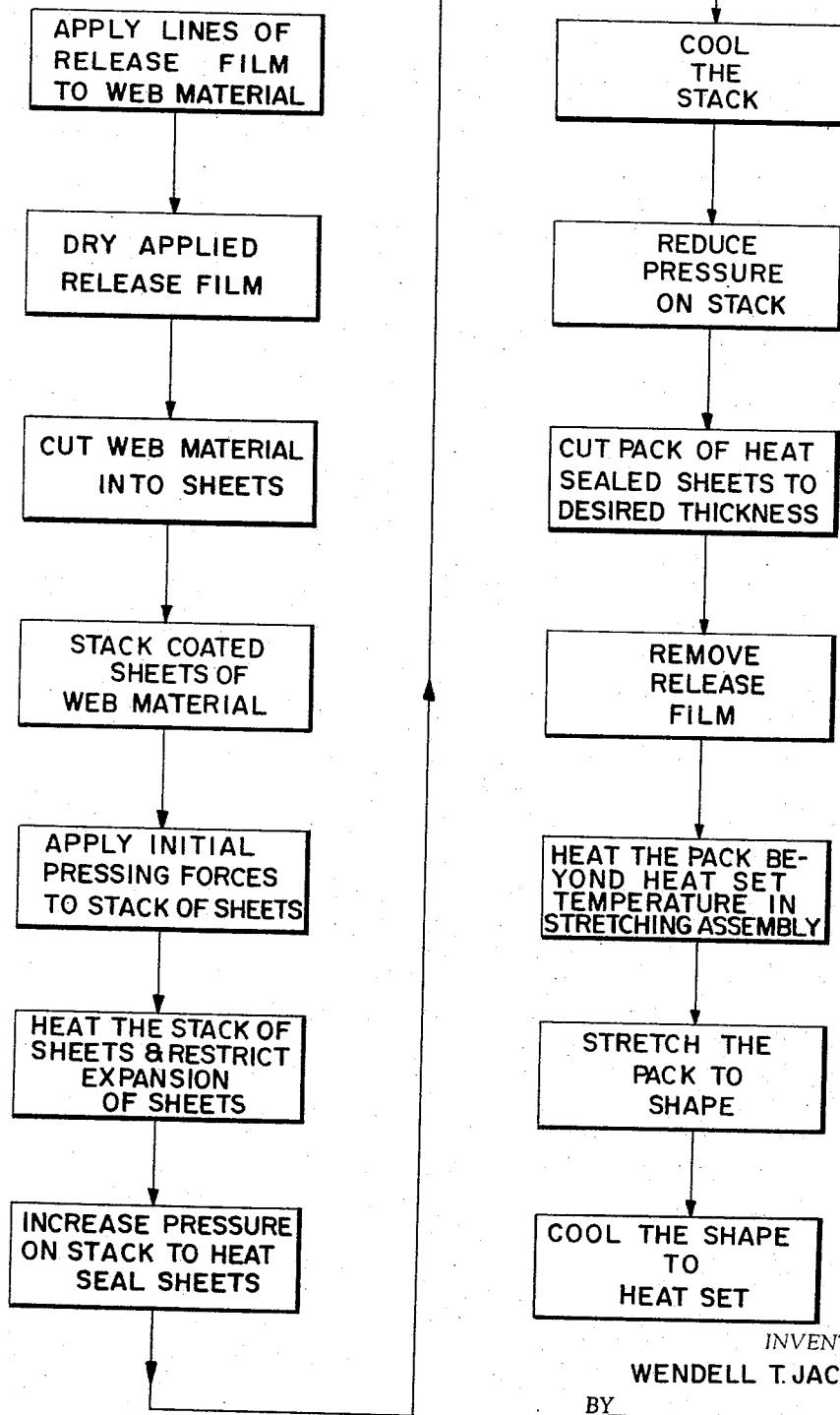

METHOD OF MAKING THERMOPLASTIC HONEYCOMB

Filed Feb. 6, 1964     3 Sheets-Sheet 3

INVENTOR.
WENDELL T. JACKSON
BY *Townsend & Townsend*

ATTORNEYS

United States Patent Office 3,366,525
Patented Jan. 30, 1968

3,366,525
METHOD OF MAKING THERMOPLASTIC
HONEYCOMB
Wendell T. Jackson, Pleasant Hill, Calif., assignor to Hexcel Corporation, a corporation of California
Filed Feb. 6, 1964, Ser. No. 342,999
3 Claims. (Cl. 156—197)

ABSTRACT OF THE DISCLOSURE

A method of making honeycomb or similar laminated structures from sheets of heat sealable plastic which are cohered together under heat and pressure at selected areas. The method involves the step of initially heating a stack of plastic sheets to permit them to thermally expand to maximum dimension before applyng heat sealing pressures, and the further step of physically confining the thermoplastic sheets against elongation or attenuation when heat sealing pressures and temperatures are applied in the bonding cycle.

The present invention relates in general to a method of manufacture for thermoplastic articles and more particularly to the method of manufacture of thermoplastic honeycomb.

The invention, to be described in greater detail below, is directed to a method of manufacturing thermoplastic articles made of heat sealed thermoplastic members and wherein lines of a release film are applied to sheets of the thermoplastic material. The coated sheets are arranged in a stack to which pressure and elevated temperatures are applied to heat seal adjacent sheets together in the regions between the lines of release film. During the heat sealing process, expansion of the sheets is restricted to provide uniform heat sealing of the sheets in the stack and prevent wrinkling of the different sheets. After the heat sealing process, the heat and pressure applied to the stack are reduced and the stack cut into packs of heat sealed sheets of desired thickness. The packs are heated to a temperature below the heat sealing temperature and expanded to the desired shape. When the expanded packs have then been allowed to cool, the thermoplastic material maintains its expanded shape.

In the past, plastic honeycomb has been constructed by adhesive bonding plastic sheets together along lines staggered on opposite sides of each sheet of plastic material. This prior art plastic honeycomb construction is only as strong as the adhesive bond between adjacent plastic sheets. Since the temperature, solubility and chemical reaction stability characteristics of the adhesive bonding agent differ from those characteristics of the plastic material, severe limitations were placed upon the usefulness of the completed honeycomb. Thus, the honeycomb could only be used in those environments in which neither the honeycomb plastic material nor the adhesive bonding agent was affected.

In the honeycomb constructed in accordance with the present invention, the bond areas adjacent sheets of thermoplastic material are heat sealed portions of the plastic material itself and therefore the bond is effectively as strong as the sheets making up the honeycomb structure.

An additional provision of the present invention is the provision of a release film which prevents bonding of adjacent plastic sheets during the heat sealing process but can be blown away from the surface of the sheets when the honeycomb structure has been completed, thereby eliminating the cost of a cleaning or washing step in the manufacturing process.

Additionally, in accordance with the present invention, the release film that is printed on the thermoplastic material can be provided with a transferable dye which transfers to substantially all non-heat sealed surfaces of the sheets during the heat sealing process for coloring the honeycomb structure manufactured by the process. In this manner, many different colored honeycomb structures can be produced from the same sheet material by merely changing the transferable dye contained in the release film.

When the honeycomb structure is made in accordance with this invention from thin plastic sheets such as on the order of 1 mil or less, the lines of release film are printed with a thickness greater in the center of the lines than at the edges of the lines to provide a pressure pad at the locaction of the heat sealed joint between the next two adjacent sheets for insuring a satisfactory bond at that location.

In accordance with the present invention, the thermoplastic web materials are restrained against undue expansion, other than thermal expansion, that would result in a deformed honeycomb structure in several different ways. One way is to place the stack of sheets in a mold slightly larger than the sheets, allowing only sufficient room in the mold surrounding the sheets to allow for normal thermal expansion that takes place in the heat sealing process. In the manufacturing process an initial low pressure is applied to the stack of sheets and the stack is heated so that the sheets expand to the limits of the mold before the pressure on the sheets is increased to produce a heat sealed bond between adjacent sheets in the regions of the sheets in between the lines of release film. The application of the initial low pressure prevents wrinkling of the thermoplastic sheets upon the application of heat while at the same time allowing the normal thermal expansion of the sheets to take place.

Another way of restraining the thermoplastic material against expansion during the heat sealing process is to produce a laminated honeycomb structure wherein the laminating materials are interleaved between every other pair of thermoplastic sheets in the stack of sheets that are provided to form the honeycomb structure thereby to restrain flow of the thermoplastic material during the heat sealing operation. Additionally, in accordance with this aspect of the present invention, the honeycomb structure that is produced is stronger due to the presence of the lamination material within the cell walls.

Other objects of the present invention will become apparent upon reading the following specification and referring to the accompany drawings in which similar characters of reference represent corresponding parts in each of the several views.

In the drawings:

FIG. 1 is a flow chart in block diagram form illustrating the steps in the manufacturing method according to the present invention;

FIG. 2 is a schematic view showing partially in side elevation and partially in isometric view a suitable type of apparatus for practicing certain steps of the present invention;

FIG. 7 is a perspective view of the structure shown in FIG. 6 but in expanded condition;

FIG. 8 is a side cross-sectional view similar to FIG. 4 illustrating another embodiment of the present invention;

FIG. 9 is a side cross-sectional view of a portion of a stack of sheets for heat setting in accordance with still another embodiment of the present invention; and FIG. 10 is a plan view of an expanded honeycomb construction produced from a stack such as illustrated in FIG. 9.

Figure 3:
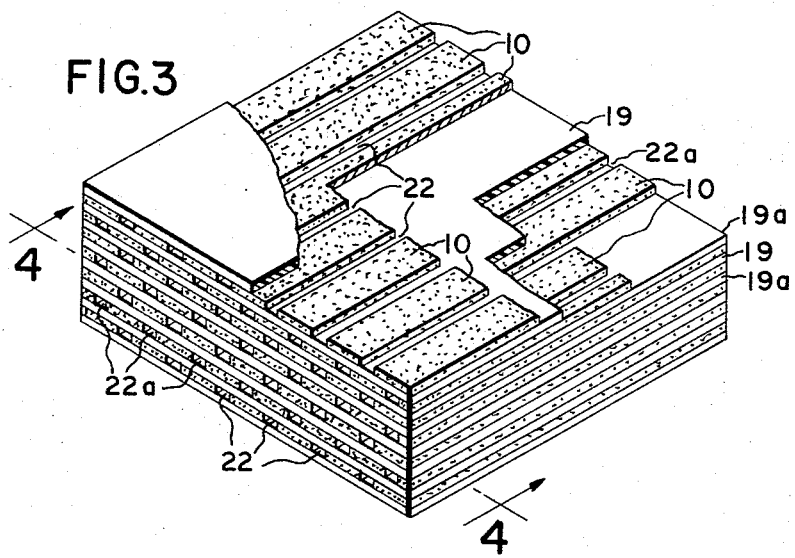
FIG. 3 is a perspective view, partially broken away, of a plurality of thermoplastic sheets printed and stacked for heat sealing together in accordance with the present invention.

Referring now to FIGS. 1 and 2, the first step involved in the preferred practice of the method is to provide a continuous web or roll of thermoplastic material, such as indicated at 9. The choice of the basic material to be used and the manner of compounding the material to form a suitable continuous web is considered largely a matter of choice depending upon the ultimate use to which the product is to be put. Moreover, the particular manner of compounding the thermoplastic to a desired condition is also considered to involve factors well known within the skill of the art and accordingly is not considered a part of the present invention per se.

To at least one side of the web 9 are applied a plurality of spaced, longitudinal, relatively wide lines 10 of a suitable release film of a type which will prevent mutual adherence or coherence of sections or sheets of the thermoplastic material to one another during the later steps of stacking, compressing and heating web sheets as more fully described hereinafter. A choice of the separating agent employed in a particular instance is also considered to be a matter of choice within the skill of the art. The release film is preferably selected so that after the honeycomb forming process, the film can be blown away by air or other fluid stream from the thermoplastic material. By way of example, I have found that for use with thermoplastic web material such as polyethylene, a liquid solution of 10% solids of cellulose acetate in ethylene glycol monomethyl ether acetate solvent which is applied in liquid form and heated to a dry film serves as a good release film which can be blown away after the process is complete.

The release film described above, however, cannot be used with polyvinyl chloride or polycarbonate thermoplastic materials and for these plastic materials, I have found that a liquid solution of 10% polyvinyl alcohol (Du Pont grade 72–52) in water with a .10% detergent (Tegitol) provides a good release film for operation in accordance with the present invention as described below.

The lines 10 of release film may be applied to the web 9 by means of a printing assembly such as, for example, that indicated in FIG. 2. More specifically, the printing assembly includes a gravure printing roller 11 with spaced apart gravure printing regions 12 for applying the lines of release film 10 to the web 9. Release material is provided to an applicator roller 13 which is in contact with the gravure roller 12 by a pick-up roller 14 which is partially immersed in a reservoir tank 155 containing a solution of the release material. A doctor knife 16 (not shown) in contact with the surface of the roller 11 removes the release material from the surface of the roller 11 between the printing regions 12. The release film is applied to the web 9 by drawing the web 9 from a roll 8 between the driven gravure roller 11 and a rubber back-up roller 11' and a motor driven roller 17 ganged to the gravure roller 11. The volatile solvents in the release film solution are driven off so as to leave a dry coating of release film by passing the web 9 through a suitable gas or electrically heated oven as indicated at 18.

The next step involved in the preferred practice of the method consists in cutting the continuous web 9 into sheets 19 of equal length by a cutter such as a rotary cutter or sheeter 20 of conventional design.

Figure 4:
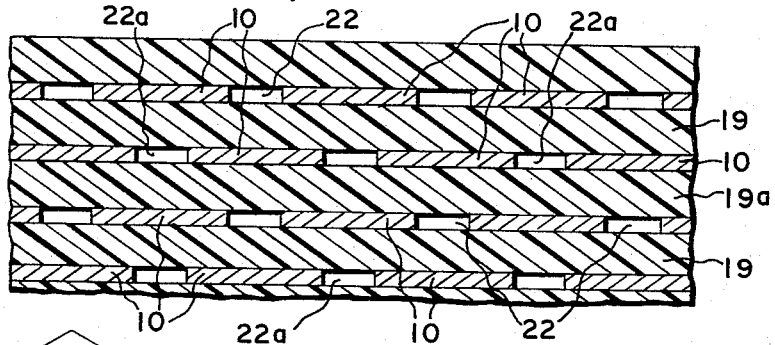
FIG. 4 is a cross-sectional view of a portion of the structure shown in FIG. 3 taken along line 4—4 looking in the direction of the arrows.

The sheets 19 are conveyed by means of an endless conveyor 20' to a stacking station where they are stacked in a stack 21 with intervening sheets 19a on which the lines of release film 11a are alternately staggered with respect to the lines of release film 11 so that in the stack of sheets 21 the lines of release film located at opposite sides of each sheet of web material are staggered with respect to each other (see FIGS. 3 and 4). Obviously, the staggered relationship of lines of release film can be achieved by other means. For example, lines of release film can be printed on both sides of a single sheet of web material with the position of the lines on one side staggered with respect to the position of the lines on the other side and an unprinted sheet of web material interleaved between each printed sheet in the final stack of sheets. Also, sheets of web material from a single printing assembly can be cut so that in one set of cut sheets, the lines of release film are staggered with respect to the outer edges of the sheet from those lines on another set of cut sheets.

By stacking the sheets 19 and 19a in the above manner, elongate, exposed regions 22 and 22a of web material on the obverse side of the respective sheets between the lines of release film 11 and 11a are disposed contiguous the underside completely exposed surface of the next adjacent sheet. It is these contiguous exposed regions of adjacent sheets which determine the areas or points between which the adjacent sheets in the stack will cohere or heat seal to one another to form an integral honeycomb structure as will more fully appear hereinafter.

Figure 5:
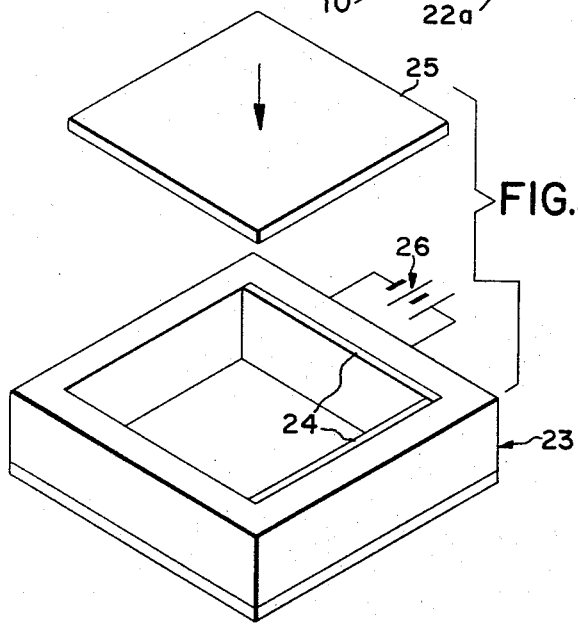
FIG. 5 is an exploded perspective view illustrating a mold into which a stack of sheets is placed for heat sealing.

The next step in the preferred practice of the method consists in subjecting the stack of sheets 21 to an initial compression force such as, for example, 15 p.s.i., to maintain the individual sheets 19 and 19a in a flat condition during initial expansion of the sheets as heat is applied thereto. More specifically and with reference to FIG. 5, the stack of sheets 21 is placed in a compression mold 23 provided with expansion shims 24 at the sides of a chamber dimensioned to receive the stack 19 and a pressure plate 25 serving as the top of the compression mold when the stack 21 has been placed inside the mold. The mold is also provided with heating means such as resistance heaters (not shown) connected to a power source 26 for heating the stack of sheets 21 in the mold. The thickness of the shims 24 is determined by the normal amount of thermal expansion which takes place in each of the sheets 19 due to the change in operating temperature within the mold during the heat sealing process, the chamber side walls being spaced apart by distances which are the dimensions of the sheets enlarged by thermal expansion. These shims 24 are removed from the mold after the stack of sheets 21 has been placed therein. While the shims have been shown as provided on only two sides of the stack, it is obvious that shims could be provided on all four sides of the stack. Compressional forces are applied to the stack of sheets by the pressure plate 25 from any conventional source such as a hydraulic cylinder (not shown) which is secured to the top of the pressure plate 25.

In the next step of the preferred practice of the invention, the stack is heated to the final heat sealing temperature such as, for example, 245° F., and during this heating step is allowed to expand radially an amount equal to the expansion due to the increased temperature. The stack is restrained by the sides of the mold 23 against expansion more than that due to thermal expansion of the sheets.

Next the compression force on the stack of sheets is increased to a level such as, for example, 200 p.s.i., at which heat sealing of adjacent sheets at the contiguous exposed regions takes place. The increased compressional force and elevated temperature applied to the stack of sheets are maintained until these contiguous exposed regions are heat sealed.

Next, the heat applied to the stack is reduced while the compressional forces are maintained on the stack to prevent wrinkling or deformation of the stack at elevated temperatures.

After the temperature of the stack has been reduced substantially, the compressional forces are reduced and the stack of sheets 21 removed from the mold 23. With the web 9 driven by the gravure roller 11 and the driven roller 17 the tension on the web passing through the oven 18 is maintained at a minimum to avoid stretching and distortion of the thermoplastic web 9 while exposed to heat.

By this sequence of steps in the application of pressure and temperature to the stack, the sheets are allowed to expand during the heating process without wrinkling and are heat sealed to one another without flowing the themroplastic material of the sheets out of the confined shape as would reduce the thickness of the sheets. If the sheets are not restrained against expansion beyond the limits of normal thermal expansion, it has been discovered that the sheets tend to flow with a resultant non-uniform thickness which results in imperfections in the resultant honeycomb structure and irregularities in the configuration of the resultant honeycomb structure.

Figure 6:
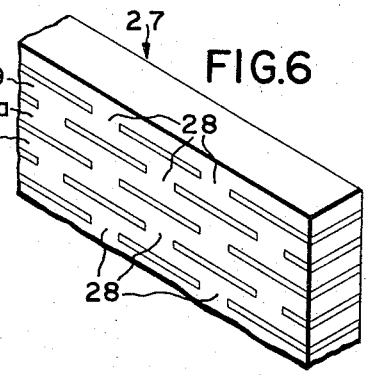
FIG. 6 is a perspective view of a portion of a stack of sheets heat sealed in accordance with the present invention.

The next step involved in the preferred practice of the method is to cut the pack of heat sealed sheets to desired thickness to produce a ribbon block 27 of honeycomb before expansion as shown in FIG. 6 in which the adjacent sheet portions are heat sealed together at regions 28 which were devoid of release film during the heat sealing operation. This step of the present invention can be accomplished by any conventional cutter, guillotine sheai, band saw or the like, or this step can be eliminated if the stack of sheets 19 is the desired thickness for the honeycomb material.

The next step involved in the preferred practice of the method involves expansion of the heat sealed sheets to form an open cellular honeycomb structure 29 as shown in FIG. 7. This step can be accomplished by any number of conventional expansion methods, one of which involves the insertion of a plurality of pins through opposite marginal end cells of the unexpanded ribbon block and the application of expansion forces to the pins to cause the material to expand to the open cellular honeycomb structure illustrated in FIG. 6.

The expansion step is preferably performed in two stages, the initial expansion forces being applied only to partially expand the cells of the honeycomb structure. With the cells partially expanded and therefore occupying a relatively small volume, the release film can be removed by blowing and/or, if necessary, application of a solvent such as acetone for cellulose acetate or water for polyvinyl alcohol. After the release film has been removed, the honeycomb structure is then expanded to full size.

During the expansion step, the honeycomb ribbon pack is heated to a temperature below the heat sealing temperature by, for example, hot air, hot water, etc., so that the modulus of rigidity of the ribbons of web material is reduced to avoid unnecessary stress upon the heat sealed bonds during the expansion step. Naturally if the stack of sheets can be removed from the mold, cut, and mounted without damage in the expansion apparatus at a temperature below the heat sealing temperature but above the heat setting temperature the extra heat step in the expansion process can be avoided.

The next step in the preferred practice of the method involves holding the honeycomb structure in expanded condition while it is cooled below thermal forming temperature which is approximately 150° for polyethylene so that the honeycomb is heat set in expanded condition. Thus, thereafter when the honeycomb structure is deformed by compression or expansion, it will tend to return to its heat set condition. In this way, the cell configuration can be established in either fully expanded or, in case such a structure is desired for a specific application, in partially expanded condition.

As an additional feature of the present invention, the step of printing the lines of released film on the web material can include the application of a raised portion or increased thickness portion 30 of release film at the center of the broad line of release film as shown in FIG. 8. This step can be accomplished by enlarged recesses in the center of the printing regions 12 on the gravure roller 11 if the viscosity of the release film is such as to permit an increased thickness at the center of the line. Under other conditions, the increased line thickness portion 30 can be accomplished by printing a second narrow line of release film on top of the previously printed broader line of release film. The width of the increased thickness portion of release film is preferably slightly less than the width of the exposed regions 22 so that the increased thickness portion serves as a pressure pad to force the exposed region 22 of one sheet into contiguous contact with the exposed surface of the next adjacent sheet of web material. This feature of the present invention is generally only applicable in situations wherein the thickness of the thermoplastic sheets is small such as 1 mil thick, and on the order of the thickness of the raised region 30 of release film.

Referring now to FIGS. 9 and 10 as still another alternative embodiment of the present invention, the sheets or mats of web material may be restrained against expansion greater than normal thermal expansion by providing reinforcing sheets between every other pair of sheets of thermoplastic web material. Desirable reinforcing materials are porous paper, such as newspaper, Kraft paper and the like or glass fiber or metal fiber, woven or unwoven, perforated metal foil or various types of metal wire or fabric screen material through the pores 39 of which the thermoplastic material can flow to heat seal during the heat sealing operation.

As shown in FIG. 9, the stack of sheets 40 can be assembled by interleaving reinforcing sheets 41 between thermoplastic sheets 42 and 42a which have lines of release film 43 and 43a respectively printed thereon, the position of lines 43a being staggered with respect to the position of lines 43. Between each printed sheet 42 and a printed sheet 42a (other than the sheet 42a spaced therefrom by the reinforcing sheet 41) is positioned a set of sheets including a porous reinforcing sheet 44 sandwiched between two thermoplastic sheets 45 free of release film. During the heat sealing process, each of the release film printed sheets 42 and 42a is heat sealed at the exposed regions to the adjacent unprinted sheet 45 as well as being heat sealed through the pores of the reinforcing sheet 41 to the next adjacent release film printed sheet. Similarly, the release film free sheets 45 on opposite sides of a common reinforcing sheet 44 are heat sealed together through the pores of the reinforcing sheet 44. The reinforcing sheets 41 and 44 serve not only as means for restraining expansion of the thermoplastic sheets 42 and 45 during the heat sealing operation but also serve as reinforcing material in the cell walls of the final expanded honeycomb structure.

Referring now to FIG. 10, there is illustrated an expanded reinforced thermoplastic honeycomb structure 50 produced from the stack shown in FIG. 9 and which is provided with reinforcing materials 51 within each wall and wherein adjacent sheets of the initial pack of thermoplastic are heat sealed together at bond regions 52.

Obviously, other stacking arrangements for the reinforcing material sheets and thermoplastic sheets are possible for producing the stack as illustrated in FIG. 9. Thus, each sheet of reinforcing material can be sandwiched between a release film printed thermoplastic sheet and a film-free thermoplastic sheet with the location of the release film staggered in successive sheets of printed sheets.

By way of illustrative example, a typical mold operation in accordance with the present invention for producing thermoplastic honeycomb includes the application of a release film consisting of 10% solids of cellulose acetate in ethylene glycol monoethyl ether acetate solvent to a polyethylene web of material 10″ wide and 4 mils thick which is cut into sheets of material 18″ long. The release film which is applied wet is approximately .1 mil thick when dry. For production of honeycomb cells ¼″ across, the release film is printed in lines .441" wide which are spaced apart by exposed or release film-free regions .135" wide. A stack of sheets is inserted in a mold provided with shims 0.152" thick along the 10" width and .085" thick along the 18" width to allow for thermal expansion of the polyethylene sheets during the heat sealing process in which the temperature of the polyethylene is raised from approximately 75° F. to 245° F.

Before heat is applied to the stack of thermoplastic sheets, an initial pressure of 15 p.s.i. is applied thereto and then the stack of sheets heated to a temperature of approximately 245° F. At this elevated temperature, the compressional forces are increased to 200 p.s.i. for approximately 10 minutes, at which time the adjacent sheets of polyethylene have been heat sealed at those regions free of release film. The mold is then first cooled, the pressure then reduced and the stack of heat sealed sheets removed from the mold. After the honeycomb has been cut to a desired thickness, it is heated to approximately 160° F. and pulled to expanded condition. In expanded condition, the honeycomb is cooled below the heat setting temperature which is approximately 150° and is then ready for use.

While for clarity of illustration in FIG. 2 the application of the release film is to the top surface of the web 9, in the preferred practice of the present invention the lines 10 of release film are applied to the underside of the web 9 thereby simplifying application by allowing the rotogravure roll to dip into the reservoir of release film formulation.

Although the foregoing invention has been described in some detail by way of illustration and example for purposes of clarity of understanding, it is understood that certain changes and modifications may be practiced within the spirit of the invention as limited only by the scope of the appended claims.

It is claimed:
1. In a method of making a honeycomb structure from a laminated stack of thermoplastic web material comprising the sequential steps of:
   (1) applying lines of release film to sections of thermoplastic web material;
   (2) forming a plurality of said sections in a stack with said lines between adjacent sections arranged in staggered relationship;
   (3) prior to applying heat sealing pressure to said stack heating said stack to temperatures below the thermal flow point of said material but at sufficiently high temperatures to permit said sections of material to elongate and thermally expand to substantially their maximum dimensions;
   (4) then simultaneously subjecting said stack to compressional forces while applying sufficient heat to cause the areas of adjacent webs to which no release film has been applied to flow and cohere with one another;
   (5) and simultaneously and during the performance of step (4) physically confining said stack of sections of material against substantial elongation and attenuation under influence of said simultaneously applied compressional forces and heat.

2. The method of claim 1 including in step (1) applying said lines with a release film capable of being blown away by a fluid stream after the sheets of said stack are cohered, and following step (5) cooling the stack and then partially expanding said stack and blowing said release film from said web sections.

3. The method of claim 1 including in step (1) the printing of each of said lines of release film with a thickness greater in the center of said lines than at the edges of said lines.

References Cited

UNITED STATES PATENTS

| | | | |
|---|---|---|---|
| 1,619,081 | 3/1927 | McLaurin | 156—289 XR |
| 2,714,571 | 8/1955 | Irion et al. | 156—311 XR |
| 2,887,425 | 5/1959 | Holland | 156—197 |
| 2,986,270 | 5/1961 | Harwood | 206—45.33 |
| 3,134,705 | 5/1964 | Moeller | 156—197 |
| 3,235,431 | 2/1966 | Paige | 156—197 |

EARL M. BERGERT, *Primary Examiner.*

H. F. EPSTEIN, *Assistant Examiner.*